US009659344B2

United States Patent
Rettig et al.

(10) Patent No.: US 9,659,344 B2
(45) Date of Patent: May 23, 2017

(54) GRAPHICS PROCESSING APPARATUS, DISPLAY APPARATUS FOR AN AIRCRAFT COCKPIT, AND METHOD FOR DISPLAYING GRAPHICAL DATA

(71) Applicant: Diehl Aerospace GmbH, Überlingen (DE)

(72) Inventors: Sven Rettig, Egelsbach (DE); Thomas Hosemann, Sitzendorf (DE)

(73) Assignee: Diehl Aerospace GmbH, Uberlingen (DE)

( * ) Notice: Subject to any disclaimer, the term of this patent is extended or adjusted under 35 U.S.C. 154(b) by 455 days.

(21) Appl. No.: 14/357,408

(22) PCT Filed: Nov. 6, 2012

(86) PCT No.: PCT/EP2012/004620
§ 371 (c)(1),
(2) Date: May 9, 2014

(87) PCT Pub. No.: WO2013/072027
PCT Pub. Date: May 23, 2013

(65) Prior Publication Data
US 2014/0253573 A1 Sep. 11, 2014

(30) Foreign Application Priority Data

Nov. 19, 2011 (DE) .......................... 10 2011 119 004

(51) Int. Cl.
*G06F 9/48* (2006.01)
*G06T 15/00* (2011.01)
(Continued)

(52) U.S. Cl.
CPC ................ *G06T 1/60* (2013.01); *G06F 9/461* (2013.01); *G06F 9/485* (2013.01); *G06F 9/4812* (2013.01);
(Continued)

(58) Field of Classification Search
None
See application file for complete search history.

(56) References Cited

U.S. PATENT DOCUMENTS

| 5,224,210 | A | * | 6/1993 | Pinedo | G09G 5/14 345/501 |
|---|---|---|---|---|---|
| 5,371,849 | A | * | 12/1994 | Peaslee | G06F 3/1423 345/553 |
| 5,410,647 | A | * | 4/1995 | Peaslee | G06T 15/50 345/467 |
| 5,428,779 | A | * | 6/1995 | Allegrucci | G06F 9/463 712/228 |
| 6,674,841 | B1 | | 1/2004 | Johns et al. | |
| 7,961,178 | B1 | * | 6/2011 | Alfieri | G06T 1/00 345/204 |
| 8,020,169 | B2 | * | 9/2011 | Yamasaki | G06F 9/3009 712/228 |
| 8,212,824 | B1 | * | 7/2012 | Allen | G06F 9/461 345/502 |

(Continued)

FOREIGN PATENT DOCUMENTS

| EP | 1 326165 A2 | 7/2003 |
| EP | 1450258 A2 | 8/2004 |

OTHER PUBLICATIONS

International Search Report dated Feb. 4, 2013 issued in PCT/EP2012/004620.

*Primary Examiner* — Joni Richer
(74) *Attorney, Agent, or Firm* — Scully Scott Murphy and Presser

(57) ABSTRACT

Graphics cards normally control the image display of data processing systems.
A graphics processing apparatus 1 is proposed which comprises a control device 2 for accepting graphical data relating to first graphic objects from a first application App_1 and for accepting graphical data relating to second graphic objects from a second application App_2; a geometry module 5 for generating the geometry data of the graphic objects from the graphical data; a raster module 7 for rasterizing the graphic objects on the basis of the geometry data and for generating pixels of the graphic objects; the control device 2, the geometry module 5 and the raster module 7 forming a graphics pipeline which is designed to process one of the graphic objects in a serial pass through by generating pixels of the graphic object from the graphical data relating to the graphic object, wherein the graphics pipeline is designed to interrupt the processing of one of the first graphic objects of the first application App_1 in a first serial pass through so that a partially processed graphic object is present, to (Continued)

process at least one of the second graphic objects of the second application App_2 in a second serial pass through, and subsequently to continue the processing of the partially processed graphic object of the first application App_1.

15 Claims, 9 Drawing Sheets

(51) Int. Cl.
*G06T 1/60* (2006.01)
*G06F 9/46* (2006.01)
*G06T 1/20* (2006.01)

(52) U.S. Cl.
CPC .............. *G06F 9/4881* (2013.01); *G06T 1/20* (2013.01); *G06T 15/005* (2013.01)

(56) References Cited

U.S. PATENT DOCUMENTS

| | | |
|---|---|---|
| 2003/0164823 A1 | 9/2003 | Baldwin et al. |
| 2007/0013693 A1* | 1/2007 | Hedrick ............... G01C 23/005 345/419 |
| 2007/0076004 A1* | 4/2007 | Wallner ............... G11C 7/1078 345/501 |
| 2007/0091101 A1* | 4/2007 | Huang ................. G06F 9/3879 345/506 |
| 2007/0103476 A1 | 5/2007 | Huang et al. |
| 2012/0105253 A1* | 5/2012 | Lillis .................. H05B 33/0818 340/945 |

* cited by examiner

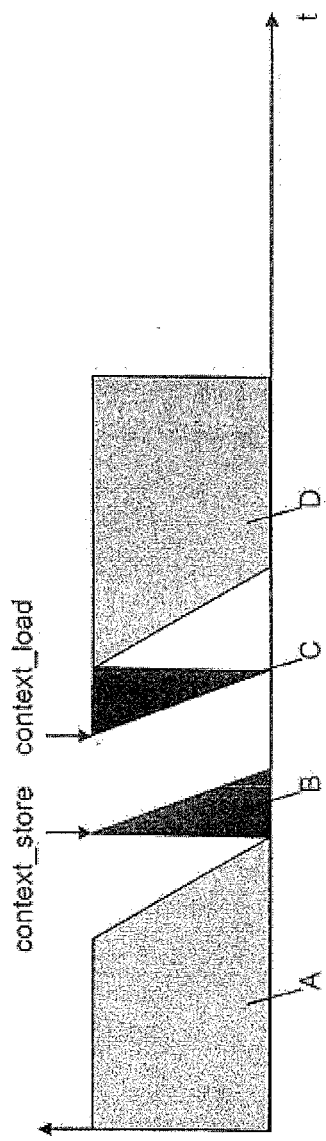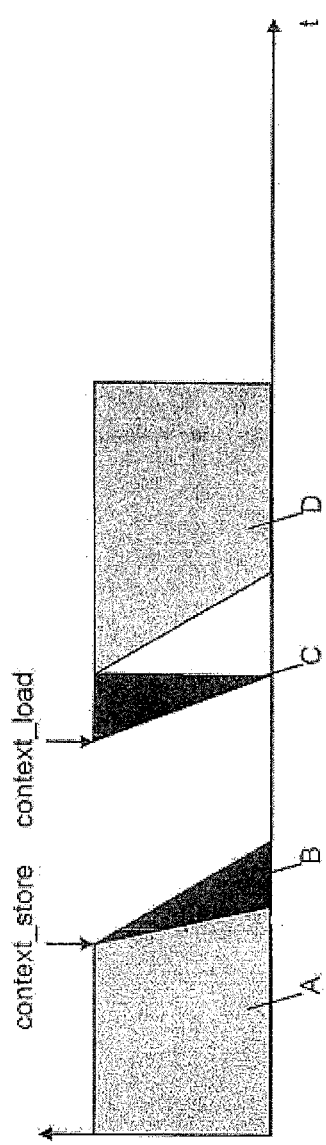

GRAPHICS PROCESSING APPARATUS, DISPLAY APPARATUS FOR AN AIRCRAFT COCKPIT, AND METHOD FOR DISPLAYING GRAPHICAL DATA

The invention relates to a graphics processing apparatus having the features of the preamble of claim 1. The invention also relates to a display apparatus for an aircraft cockpit having said graphics processing apparatus, and to a method having said graphics processing apparatus.

Graphics cards usually control the image display of data processing systems. In this case, an application on the data processing device generates data for a graphics output and passes on said data to the graphics card. The graphics card converts the data so that a display device can reproduce the desired output as an image. Such graphics cards are included in every commercially available PC either as an extension card or as an onboard chipset.

It is equally known of commercially available PCs that a graphics card can control two different display devices, for example two display screens. In said designs, it is possible to display the graphics output of a first application on the first display screen, and to display the graphics output of a second application on the second display screen.

It is the object of the invention to propose a graphics processing apparatus which corresponds to increased safety requirements. It is a further object of the invention to propose a display apparatus for an aircraft cockpit and a method which respectively has said graphics processing apparatus.

Said objects are achieved by a graphics processing apparatus having the features of claim 1, by a display apparatus for an aircraft cockpit having the features of claim 12 and by a method having the features of claim 14. Preferred or advantageous embodiments of the inventions emerge from the subclaims, the following description and the attached figures.

The subject matter of the invention is a graphics processing apparatus, in particular designed as a graphics processor, which is suitable, and/or designed, to convert graphical data of graphic objects into pixels of the graphic objects.

The graphic objects can be designed in general as a complete image or as a partial image. In preferred embodiments, the graphic objects are implemented as one or more graphics primitives. For example, complex graphic objects are displayed by one or more graphics primitives in the OpenGL specification. A graphics primitive can be, for example, a triangle or a line.

The graphics processing apparatus is particularly preferably implemented as an integrated circuit and, in particular, as an FPGA (field programmable logic gate arrangement or field programmable gate array).

The graphics processing apparatus comprises a control device which is designed to accept graphical data relating to first graphic objects from a first application, and to accept graphical data relating to second graphic objects from a second application. The graphical data are designed, in particular, as a command set for generating at least one graphics primitive.

The control device can, for example, be connected for signaling purposes to a bus, in particular a PCI bus, for accepting the graphical data, and/or have an interface for connecting to said bus for signaling purposes.

Furthermore, the graphics processing apparatus comprises a geometry module for generating the geometry data of the graphic objects from the graphical data. The geometry module can, in turn, have a plurality of submodules which perform one, some or all of the following tasks, which are set forth merely to inform, since said submodules are known:

Submodule for Model Transformation and Camera Transformation:

Said submodule performs a transformation of the graphic objects into a reference coordinate system, in particular world coordinate system, and by way of optional development a transformation of the camera into the zero point of the reference coordinate system.

Submodule for Lighting:

Said submodule calculates a color and/or brightness for each graphic object, in particular for each graphics primitive.

Submodule for Projection:

Said submodule performs the transformation of the sight volume into a cube.

Clipping:

Said submodule cuts off graphic objects which are located outside the sight volume.

Window Viewport Transformation:

The graphic objects are shifted and scaled in said submodule.

The geometry module outputs geometry data of the graphic objects as the processing result. Said geometry data are picked up by a raster module which forms a further component of the graphics processing apparatus, and evaluated to rasterize the graphic objects. In particular, all the graphic objects, in particular all the primitives, are rasterized in the raster module, that is to say the pixels belonging to them are colored. The raster module thus generates pixels of the graphic objects.

The control device, the geometry module and the raster module together form a graphics pipeline which is designed to process one of the graphic objects in a serial pass through by generating and outputting pixels of the graphic object from the graphical data from the application relating to the graphic object. The geometry module and the raster module are also denoted below by way of summary as the modules.

In particular, the graphics processing apparatus is designed as a GPU (graphics processing unit), specifically as an FPGA-GPU, which has a plurality, in particular more than 50, preferably more than 100 such graphics pipelines.

It is proposed within the scope of the invention that the graphics pipeline be designed to interrupt the processing of one of the first graphic objects in a first serial pass through so that a partially processed graphic object is present, to process at least one of the second graphic objects in a second serial pass through, and subsequently to continue the processing of the partially processed graphic object in the same graphics pipeline.

In particular, the graphics pipeline is designed so that time multiplexing is performed with reference to the graphic objects of the first and of the second application. In this case, graphic objects of the first and of the second application are processed one after another, there being no need, however, for the graphic object of the first applications to be completely processed—rather, the processing of the graphic object of the first application can be interrupted, and the processing of a graphic object of the other application can be interposed before the processing of the graphic object of the first application is ended.

The interruption is preferably performed for each graphic object of the first application.

As a result of the design of the invention, a separation, in particular a time separation is produced between various applications inside the graphics processing apparatus, in particular the graphics pipeline. This separation is also denoted as temporal segregation in English.

Such a separation is required for the approval of graphics processing apparatuses of a high safety level, for example in accordance with DO-178 B or ED-12 B. For example, the two applications can be assigned different safety levels, for example DAL A and DAL B, and nevertheless access the same data processing apparatus, in particular graphics pipeline. The advantage of the invention is therefore to be seen in that a higher safety level is achieved by the time separation of the two applications in the graphics processing apparatus. In contrast, commercial graphics processes include no such safety mechanisms, in particular since the latter are not required in the normal environment (installation in PC, Notebook, etc.).

In a preferred embodiment of the invention, the graphics pipeline prescribes a series of successive time slots which are each of equal length. By way of example, the successive time slots can be selected such that 30 time slots are provided per second, and so the graphics pipeline has a clock speed of 30 Hz.

It is preferably provided that the partial processing of one of the first graphic objects and the processing of at least one of the second graphic objects are performed within a common time slot. Said splitting of the graphic objects into various, and yet combined time slots has the advantage that, for example, a graphic object is processed in each time slot by a first application with a relatively high update rate such as, for example, 30 Hz so that the graphic objects are processed by said application without delay. In another application, the update rate is, for example, lower, for example 15 Hz, a graphic object being half processed, or processed to an advantageous proportion, per time slot of the graphics pipeline, and the remaining residue of the graphic object being further processed as a partially processed graphic object in a subsequent time slot.

Although reference is made to only two applications in the description, it is also possible for more applications to access the graphics processing apparatus, in particular the graphics pipeline and divide the resources. It is also conceivable in principle for two applications to access with an update rate of 15 Hz, a graphic object of each application being partially processed in each time slot of the graphics pipeline. It is, furthermore, conceivable for one application to have a yet lower update rate, for example 10 Hz, so that the processing of the graphic object is distributed over more than two time slots, here three time slots.

In general terms, the graphics processing apparatus enables graphic objects of various applications to be distributed over the time slots in such a way that the processing of at least one graphic object is performed over at least two or more time slots.

In a preferred embodiment of the invention, the successive time slots define a synchronization clock for the processing of the graphic objects. The processing of the graphic objects of the first application is performed, by contrast, asynchronously to said synchronization clock. It can thereby be provided that the interruption of the processing of the first graphic object is performed in accordance with a set pattern, so that, for example, the processing of one of the first graphic objects is always distributed over two time slots. Alternatively, the interruption of the processing of the first graphic objects can also be performed dynamically, in particular as a function of the available working time within a time slot. It is particularly preferred always to interrupt at the same instant within a time window.

In a preferred implementation of the invention, the graphics processing apparatus has a time planner which is designed to output a memory signal for interrupting the processing of the first graphic object to the graphics pipeline.

It is preferred that the modules, in particular the geometry module and the raster module, when the memory signal is present, end their internal calculations, that is to say accept a primitive rendering or the like, but no longer accept any further command relating to the current graphic object. It is thereby ensured that the interruption in the processing of the first graphic object is not performed without control, but at an instant from which it is possible to follow on at a further instant, in particular during a further time slot.

As a further reaction to the memory signal, the graphics pipeline is designed to output context data of the partially processed graphic object. The context data comprise, in particular, the register data of the modules and the data from the adjacent input and output memories, in particular fifo memories. Said context data is optionally buffered and made available for the later serial pass through the graphics pipeline in order to continue the processing. At the instant at which the memory signal is applied, all the data required for further processing of the current, partially processed graphic object are therefore assembled as context data and optionally buffered.

After the context data of the current partially processed graphic object has been read out of the graphics pipeline, the graphics pipeline can be prepared for processing one of the two graphic objects and used.

In a preferred development of the invention, the context data is output to the time planner at the end of the graphics pipeline, in particular via the raster module. The context data are thus read out serially for the different modules and, if appropriate, interposed memory devices, in particular fifo devices. Said implementation firstly simplifies the signaling design of the graphics processing apparatus, since not every module and every memory device need have a dedicated data output for outputting the context data. Secondly, the context data can be ordered, that is to say be read out in a determined sequence, and—as explained further later—be input into the graphics pipeline again in ordered fashion for further processing.

In a preferred design of the invention, the time planner is designed to store the context data in a memory. Because the context data are stored in a memory, the time planner can now introduce graphical data of another graphic object into the graphics pipeline without being hindered by the context data.

In a preferred development of the invention, the time planner is designed to output a restore signal for passing on the processing of the partially processed graphic object to the graphics pipeline. At said instant, if appropriate the time planner reads out the context data from the memory and transmits said data into the graphics pipeline again for further processing.

In a preferred implementation of the invention, the time planner forms with the graphics pipeline a ring structure such that upon the occurrence of a memory signal the context data are read out at the end of the graphics pipeline, and such that upon the occurrence of a restore signal the context data are loaded into the graphics pipeline. As an optional development, the memory is connected to the ring structure for temporary storage of the context data, and/or an input is provided for accepting graphical data relating to the graphic objects from the applications.

It is particularly preferred to interpose between the modules or the submodules such as have been described previously memory devices which are, in particular, designed as fifo (first in first out) memories. The context data has, in particular register data of the modules and fifo data from the storage devices.

The register data preferably have a signal flag, in particular a signal bit, which is set to a first value, hereinafter 0, by way of example, in normal operation of the graphics pipeline and to another value, hereinafter 1, by way of example, in memory operation. The register data to be stored as context data are thereby marked with the signal flag. The signal flag has the advantage that register data which have a signal flag with the value 1 are pushed serially through the graphics pipeline and not processed.

The fifo data also optionally have the signal flag, the latter being, however, always set to the first value, that is to say 0. It is thereby possible to distinguish fifo data from register data by referring to a memory signal.

Once—as already explained—the register data and the fifo data are read out serially, and furthermore the signal flag has been set to the value 0 in the case of the fifo data and to the value 1 in the case of the register data in a reading-out operation, the signal flag can be used for the evaluation of positions of data.

Considering a data flow of the context data, there is e.g. initially a first register data block, then a first fifo data block, then a second register data block, then a second fifo data block, etc. On the basis of the sequence and of the signal flag, said sequence can be assigned unambiguously to the modules and the memory devices so that the later reloading of the context data into the graphics pipeline can be performed unambiguously.

In a preferred development of the invention, the graphics processing apparatus has a pixel memory which is designed for storing the pixels from the raster module. It is particularly preferred for the time planner to be designed to allocate different memory areas to the pixels of different applications in the pixel memory. It is preferably possible for the allocation of the memory areas not to be influenced by the user or by the application, so that a reliable spatial separation (spatial segregation) of the applications is thereby provided. This development further increases the standard of safety of the graphics processing apparatus.

A further subject matter of the invention relates to a display apparatus for an aircraft cockpit having the graphics processing apparatus, as has been described previously, and/or according to one of the preceding claims, the display apparatus having at least a first and a second display area, it being possible to display graphic objects of the first application on the first display area, and to display graphic objects of the second application on the second display area. The display areas can be two display areas of a common display screen, or display areas of two different display screens.

In a particular refinement of the invention, the first display area serves to display a primary flight display (PFD), and the second display area serves to display a navigation display (ND). Said two applications are both relevant to safety in the aircraft cockpit, and so the software implementation requires a high level of safety such as is achieved by the graphics processing apparatus as previously described.

It is particularly preferred for the first and the second application to have different update rates.

A further subject matter of the invention relates to a method having the features of claim 14.

Further features, advantages and effects of the invention emerge from the following description of preferred exemplary embodiments of the invention. Here:

Figure 4A:
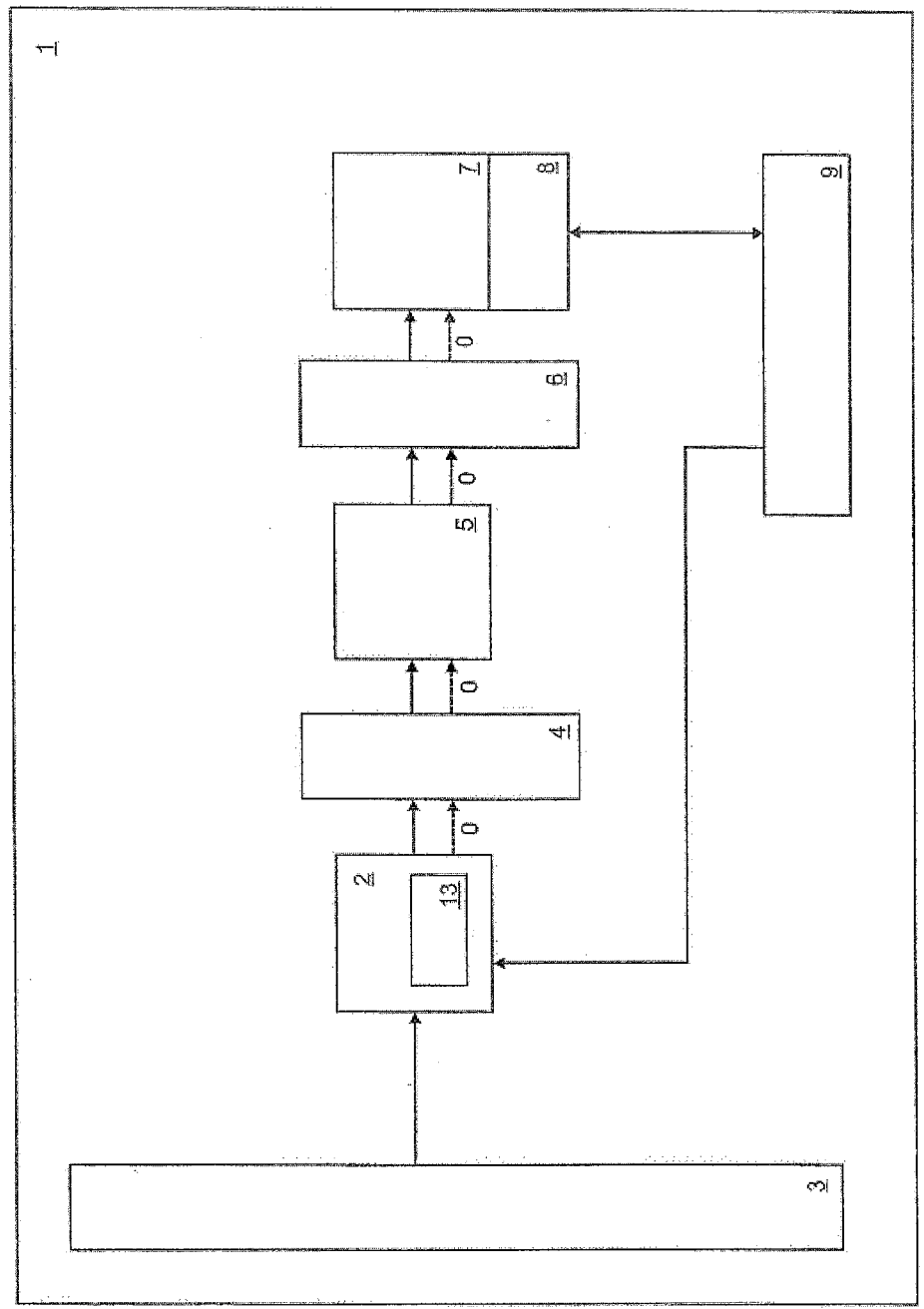
Figure 5:
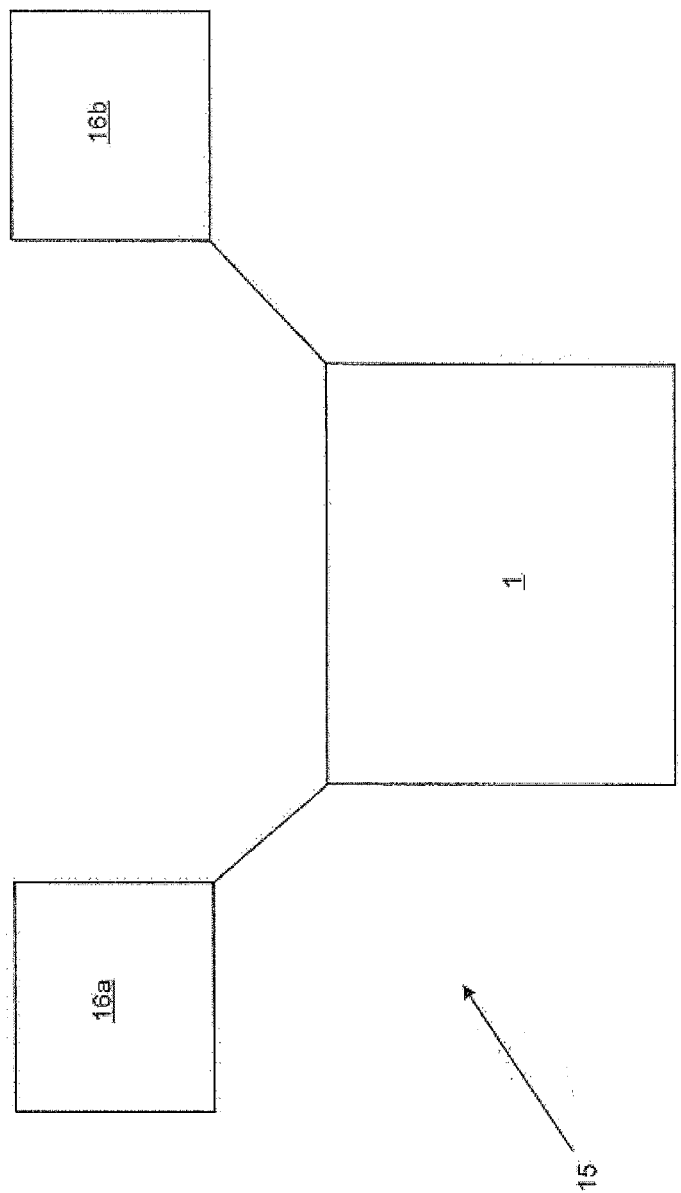

FIGS. 4a, b, c, d show the graphics processing apparatus of the preceding figures in various operating states for the purpose of explaining their mode of operation;

FIG. 5 shows a schematic illustration of a display apparatus for an aircraft cockpit having the graphics processing apparatus of the preceding figures; and FIGS. 6a, b show a schematic illustration of the time sequence in the case of an interruption and a resumption of the processing of a graphic object.

Figure 1:
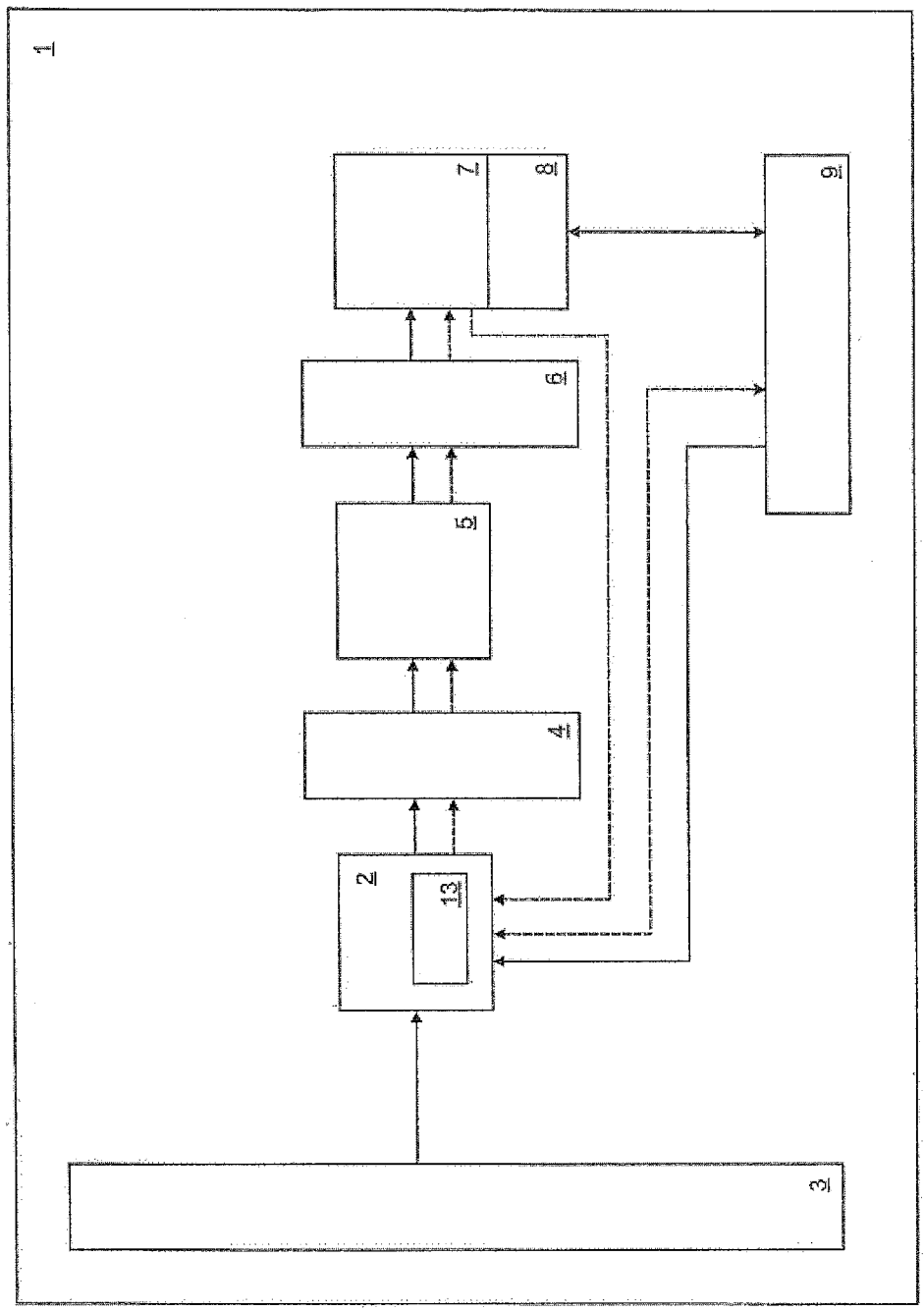
FIG. 1 shows a schematic block diagram of a graphics processing apparatus as an exemplary embodiment of the invention.

In a schematic block diagram, FIG. 1 shows a graphics processing apparatus 1 as an exemplary embodiment of the invention which enables graphics commands from applications to be converted into pixels which can be displayed on display devices as graphics output of the applications. The graphics processing apparatus 1 is implemented as hardware and designed as an FPGA.

The graphics processing apparatus 1 comprises a control device 2 which is connected via an interface 3 to a data bus such as, for example, a PCI bus. Via the interface 3, applications pass on graphical data, in particular graphics commands, to the control device 2 in order to generate the pixels for the application.

Starting from the control device 2, the graphical data are passed on to a first memory device 4 with an fifo architecture which, as input buffer, provides the graphical data for processing in the downstream geometry module 5. In the geometry module 5, the graphical data, in particular the graphics commands, are partially converted, and graphics primitives, that is to say triangles or lines, for example, with color definitions if appropriate, are formed. The processed graphical data and/or the graphics primitives are passed on into a further memory device 6, which is likewise designed as an fifo memory, and then read into a raster module 7. In the raster module 7, there are generated from the geometry primitives together with the color definitions pixels which are subsequently in a pixel memory 8 and output therefrom via a data interface 9.

The control device 2, the geometry module 5 and the raster module 7 together with the memory devices 4 and form a so-called graphics pipeline, since the graphical data are serially processed inside the graphics pipeline. While the block diagram shown in FIG. 1 illustrates the geometry module 5 and the raster module 7 only as a single block, in a hardware implementation the geometry module 5 can also be divided into a plurality of, in particular five, submodules, memory devices in fifo architecture respectively being arranged between the submodules. In the same way, the raster module 7 can also be subdivided into a plurality of submodules which are interconnected for signaling purposes with the interposition of memory devices designed as fifo memories.

A plurality of such graphics pipelines can be arranged parallel to one another in the graphics processing apparatus 1 in order to generate the pixels for the graphic display of the application in common. The graphics processing apparatus 1 and the graphics pipeline operate in a synchronous clock of 30 hertz so that when the synchronous clock is utilized the application can output an image which can be displayed on the display device with an update rate equal to the synchronous clock.

The generation of graphics for a single application is already possible by means of the already described components of the graphics processing apparatus 1. The data processing apparatus 1 is, however, additionally capable of quasi-parallel processing of a plurality of applications, in particular at least two applications, there being produced from the point of view of data processing both a temporal and a spatial separation between the applications (temporal and spatial segregation). Such a separation is necessary for the approval of software and hardware according to a high level of safety, for example DAL A/B.

The basic principle is that it is possible at a selectable instant to store data and parameters inside the graphics pipeline as context data which can be reused later so that an application can be set aside in the graphics pipeline for a short time.

The advantage of the graphics processing apparatus 1 resides in a higher level of performance and in the possibility of mixing various applications on the same data processing apparatus 1. Thus, for example, it is possible to mix a DAL C function, which is retrieved only once/twice per second, with a DAL A function, which is retrieved 30 times per second. In the process, the image of the DAL C function can be partially generated in a cycle of the synchronous clock, and the generation can be continued later.

Figure 2:
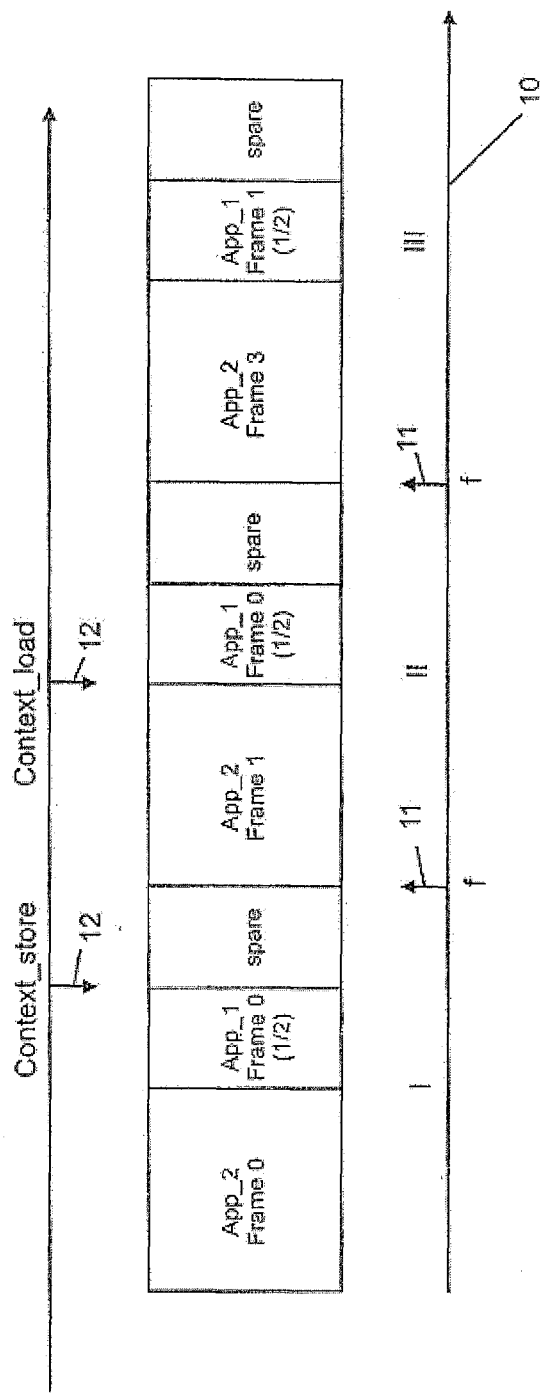
FIG. 2 shows a timeline schematically displaying the processing of graphic objects in the graphics processing apparatus of FIG. 1.

This principle of the mode of operation is illustrated schematically in FIG. 2, which shows a timeline for the data processing apparatus 1.

The horizontally running, lower arrow 10 shows the synchronous clock with the frequency f, the individual clock sections being denoted by arrows 11.

The data processing apparatus 1 processes an image 0 (frame 0) of a second application App_2 completely in the first synchronous clock I. Subsequently, the image 0 (frame 0) of a first application App_1 is for example half processed, so that the processing of said image 0 is interrupted. The remaining area (spare) in the synchronous clock I is a safety time buffer.

The second application App_2 completely processes an image 1 (frame 1) in the synchronous clock II. By contrast, the first application App_1 processes the image 0 (frame 0) to the end so that it is available after the second synchronous clock II.

In the third synchronous clock III, an image 2 (frame 3) of the second application App_2 is processed, and an image 1 (frame 1) of the first application App_1 is processed at least partially again.

With this temporal split up, there is a mutual temporal separation in the generation of the graphics of the two applications App_1 and App_2 inside the graphics processing apparatus 1 and inside the graphics pipeline.

For the application App_2, a complete image is generated in each synchronous clock I, II, III so that the second application App_2 has an update rate corresponding to the synchronous clock, that is to say 30 hertz, for example. By contrast, in each synchronous clock I, II, III the first application App_1 processes only half an image or a partial image, the processing is interrupted and continued in the next synchronous clock. The first application therefore attains an update rate of half f, for example 15 hertz.

For the first application App_1, after the interruption of the processing of the image it is necessary to buffer the data which are required to finish the image in the next synchronous clock—denoted below as context data—, in order to separate them temporally and spatially from the second application App_2 and not to hinder their processing.

It is possible in principle to interrupt the processing in each status of the conversion process, for example when a red line is being shown on the display device. All necessary data which are required for further processing are stored as context data after the interruption. For the example of the red line, this would comprise data relating to the current color and the position where the rendering was terminated.

While the graphics processing apparatus 1 is concerned with the conversion of the images of the applications, the at least one graphics pipeline in the graphics processing apparatus 1 processes graphic objects which are components of the image of the application. Consequently, when the processing of an image of the first application is interrupted in the graphics pipeline, the processing of graphic objects, for example graphics primitives, is interrupted in the graphics pipeline in a synchronous clock, and passed on into another synchronous clock.

In order to be controlled, the graphics processing apparatus 1 of the graphics pipeline has a time planner 13 which firstly, in accordance with arrow 12, outputs a memory command context_store as soon as the processing of the image of the first application App_1 is to be interrupted, and a restore signal context_load as soon as the processing of the image is to be passed on in the next synchronous clock.

Further tasks of the time planner 13 are to store and retrieve said context data, and to output control data to control the memory area in the pixel memory 8, it being ensured that the two applications App_1 and App_2 access different, non-overlapping memory areas in the pixel memory 8, and are thus spatially separated from one another in said area. The control data form a portion of the data in the raster module 7 and are set by a specific graphics command which cannot be used by the applications App_1 and App_2. In this way, the data in the pixel memory 8 are reliably spatially separated so that a spatial segregation results.

In accordance with the memory command context_store, the modules, in particular the geometry module 5 and the raster module 7 and their submodules, are instructed to bring a current calculation of graphic objects to an intermediate conclusion which is selected such that it is possible to link to said intermediate conclusion in the next synchronous clock in order to continue the graphics generation. Subsequently, the context data are read out in accordance with the dashed arrows in FIG. 1.

Beginning with fifo data from the memory device 4, register data from the geometry module 5, fifo data from the memory device 6 and register data from the raster module 7, the context data are shifted on serially and transferred to the time planner 13 via an additional data path. A ring structure is thereby produced between the graphics pipeline and the time planner 13. The time planner 13 stores the context data in a memory via the data interface 9.

After the context data have been read out, the memory processing apparatus 1 or the graphics pipeline is ready to process an image of the second application App_2 in a next synchronous clock.

Figure 3:
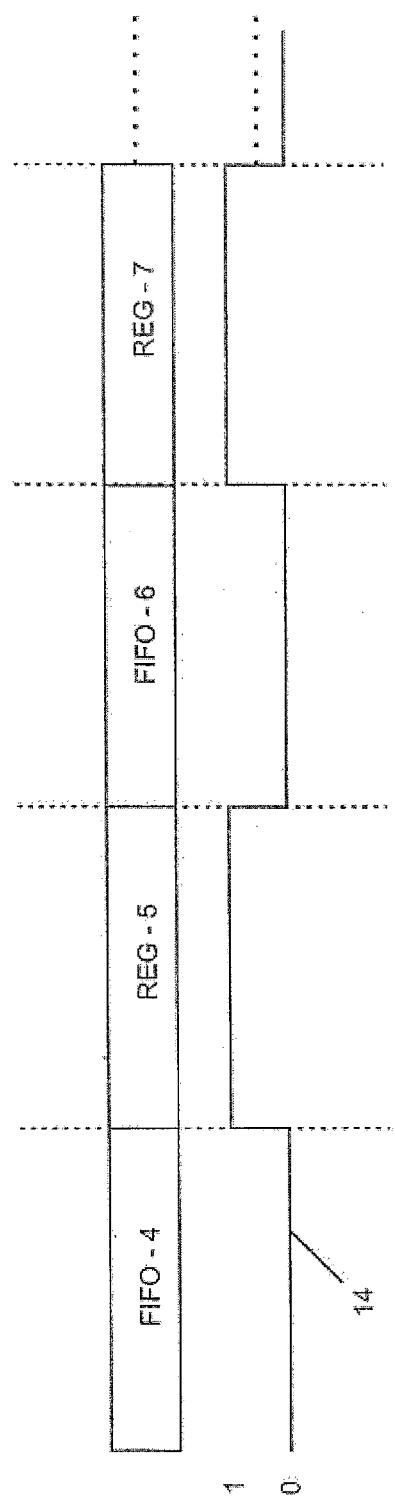
FIG. 3 shows a timeline schematically displaying the structure of the context data from the graphics processing apparatus in FIG. 1.

The structure of the data to be read out is illustrated schematically in FIG. 3. It is to be seen in FIG. 3 that there are arranged in a data stream firstly fifo data FIFO-4 of the memory device 4, subsequently register data REG-5 of the geometry module 5, subsequently fifo data FIFO-6 of the memory device 6, and subsequently register data REG-7 of the raster module 7. The data in the data stream correspond to the data from the modules 5, 7 and/or from the memory devices 4, 6 upstream of the data being read out or shifted on in accordance with the memory command context_store. If the graphics pipeline is intended to have more submodules and more memory devices arranged between the submodules, the data stream is to be lengthened correspondingly. The context data are expanded by a signal flag 14 which is always set to 0 in normal operating mode so that the modules can read out therefrom that the corresponding register data are to be processed. If, however, the memory command context_store is present, each of the modules sets the signal flag of its register data to 1 and thereby shows that the subsequent modules are intended not to process the register data, but to shift them on in the direction of the time planner 13 via a bypass. The data of the memory devices 4, 6 keep the signal flag always on "0", the signal flag being interpreted by the subsequent modules as "don't care" so that these data are also shifted on via a bypass.

In the case when no data are present in the memory devices 4, 6 or in the modules 5, 7, a dummy word is written in in order to keep the structure of the data stream.

As the processing is continued in the next synchronous clock, the time planner 13 applies the restore signal context_load, reads the context data of the partially processed image out via the data interface 9 and shifts said context data on into the graphics pipeline. The assignment of the data in the context data can be deduced via the sequence and the alternating signal flag 14. Thus, the memory device 4 is aware that it must accept the last data block for fifo data. The geometry module 5 also counts the number of signal flags and extracts the data block in which the number of signal flags 14 is equal to 2. The memory device 6 likewise counts the signal flags 14 and knows that they must extract the fifo data downstream of the first signal flag 14. By contrast, the raster module 7 accepts data from the first signal flag 14. This procedure is expanded to any desired number of submodules, each submodule extracting from the data stream the register data which it recognizes as its own data with the aid of the number of transitions of the signal flag 14 compared with its own position inside the graphics pipeline.

After the partially processed image is finally processed, new graphical data can be read into the graphics pipeline subsequently via the control device 2, the signal flag being set to 0.

The individual steps are illustrated once again in FIGS. 4 a, b, c and d. The graphics pipeline in FIG. 4a is in the normal operating state, graphical data being directed through by the control device 2 via the memory device 4 into the geometry module 5, subsequently into the memory device 6 and the raster module 7, and processed.

Figure 4B:
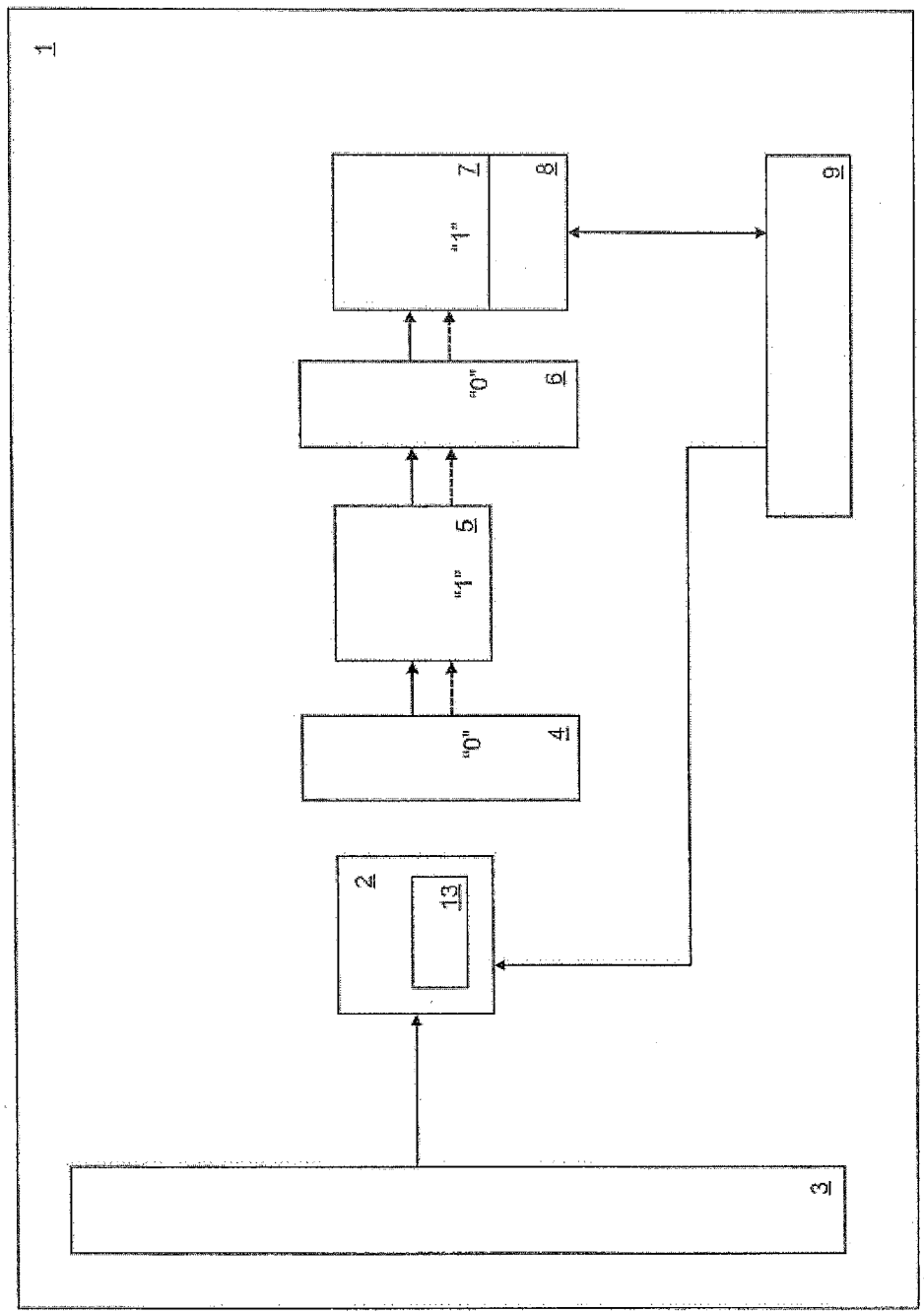

As soon as the memory signal context_store is to hand, no further graphical data are fed into the graphics pipeline by the control device 2. The geometry module 5 and the raster module 7 terminate their current calculations and set the signal flag 14 of their current register data to the value 1, as is illustrated in FIG. 4b. The data in the memory devices 4, 6 keep the signal flag on "0" as fifo data.

Figure 4C:
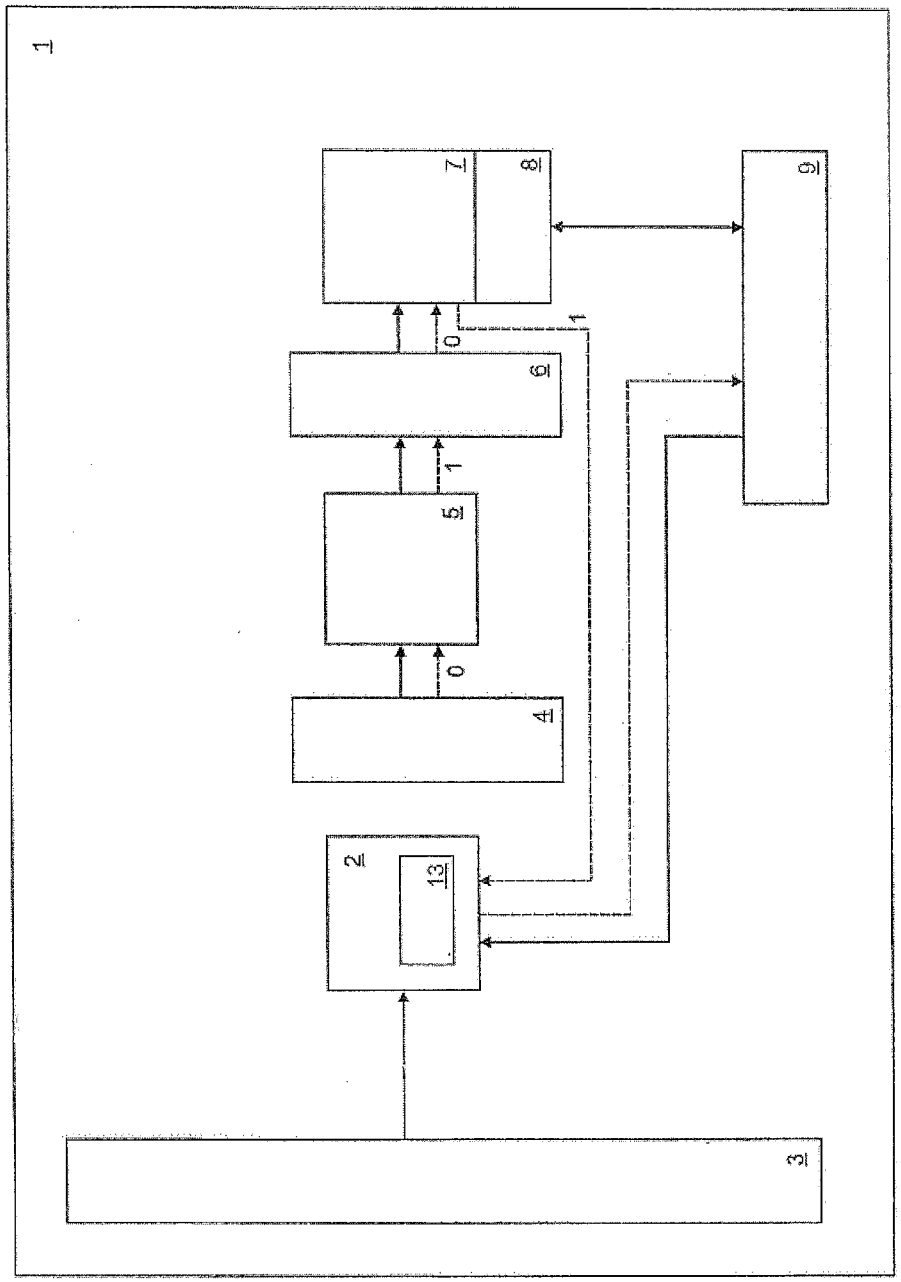

In accordance with FIG. 4c, the context data are read out and transferred to the time planner 13, the raster module 7 using a bypass to pass through, without processing, data from the memory devices 6 with a signal flag 14 set on "0" as "don't care", and data from the geometry module 5 with a signal flag set on "1", so that the data stream with the context data with the structure in accordance with FIG. 3 flows to the time planner 13. Said context data are stored via the data interface 9 as described.

Figure 4D:
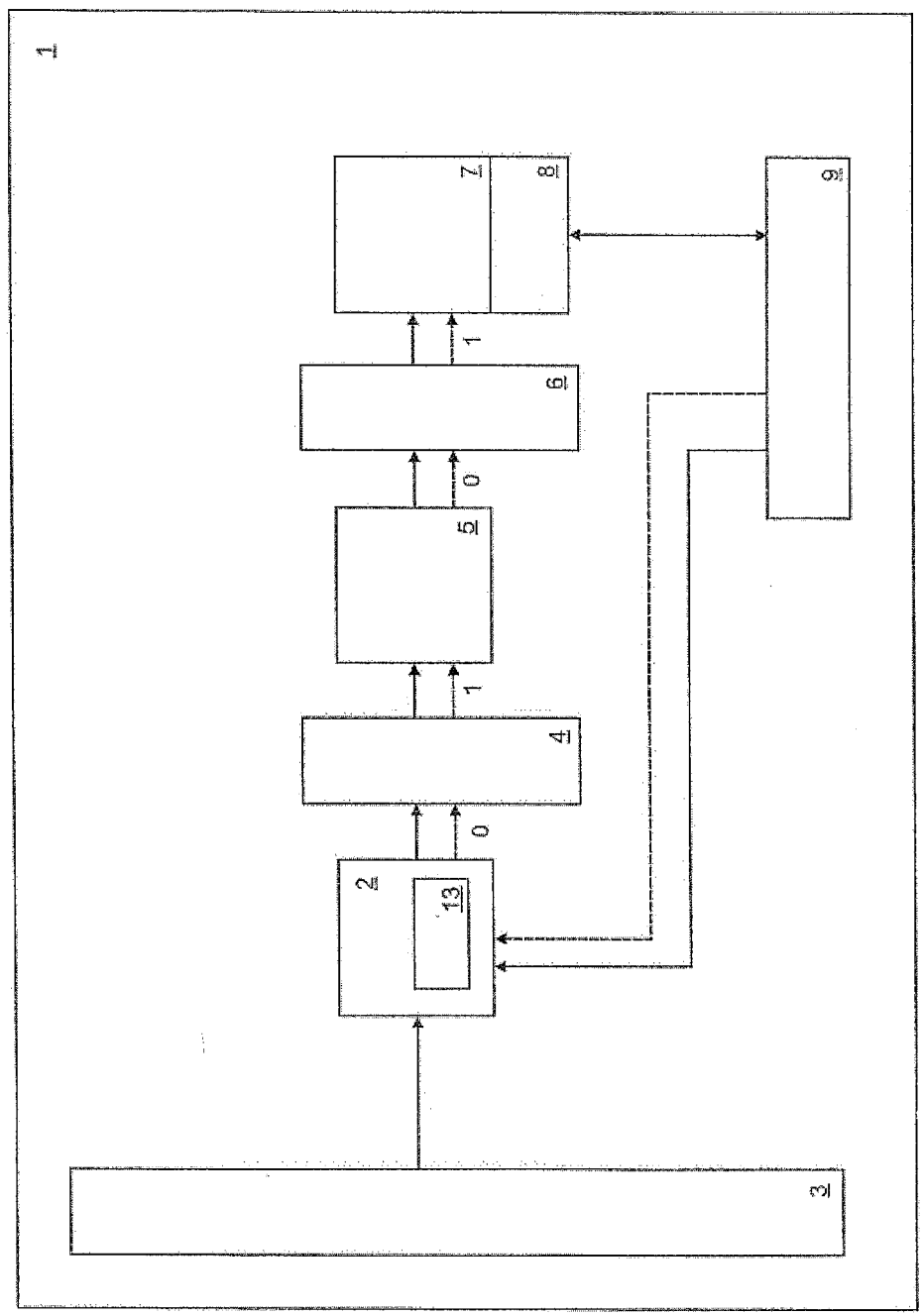

FIG. 4d illustrates the behavior of the data processing apparatus 1 upon application of the restore signal context_load, the context data being read out by the time planner 13 via the data interface 9 and being introduced into the graphics pipeline. In this case, each memory device 4, 6 and each module 5, 7 counts the number of signal flags 14 in order to detect their own data. As soon as the data are distributed, the further processing of the partially processed graphic object is taken up.

Finally, FIG. 5 shows a display device 15 having a first display 16a and a second display 16b which, as previously described, are driven via the graphics processing apparatus 1. By way of example, a primary flight display (PFD) is displayed on the display 16a, and a navigation display (ND) is displayed on the display 16b, said displays being generated by two different applications, such as App_1 and App_2 in the graphics processing apparatus.

FIGS. 6a, b illustrate the time sequence of an interruption and the resumption of the processing of a graphic object in the graphics pipeline on a time axis t:

In section A, the processing of the graphic object is carried out regularly. Upon application of the context_store command, the current calculations are terminated in section A, and the processing of the current graphic object is thereby interrupted. After the termination, the context data are read out in section B. In a next time slot, the context data are read in again in section V and further processed in section D.

FIG. 6a shows a regular interruption of the processing of the graphic object which is performed at the same instant in each time slot affected. By contrast, FIG. 6b illustrates the situation of a time-out in a time slot, otherwise than in FIG. 6a the context data being read out immediately after application of the context_store command.

LIST OF REFERENCE NUMERALS

1 Graphics processing apparatus
2 Control device
3 Interface
4 Memory device
5 Geometry module
6 Memory device
7 Raster module
8 Pixel memory
9 Data interface
10 Lower arrow
11 Arrows, partial section
12 Arrow, memory command
13 Time planner
14 Signal flag
15 Display device
16a First display
16b Second display

The invention claimed is:

1. A graphics processing apparatus comprising:
a control device for accepting graphical data relating to first graphic objects from a first application and for accepting graphical data relating to second graphic objects from a second application;
a geometry module for generating the geometry data of the graphic objects from the graphical data;
a raster module for rasterizing the graphic objects on the basis of the geometry data and for generating pixels of the graphic objects;
the control device, the geometry module and the raster module forming a graphics pipeline which is designed to process one of the graphic objects in a serial pass through by generating pixels of the graphic object from the graphical data relating to the graphic object, wherein the graphics pipeline is designed to interrupt the processing of one of the first graphic objects of the first application in a first serial pass through so that a partially processed graphic object is present, to process at least one of the second graphic objects of the second application in a second serial pass through, and subsequently to continue the processing of the partially processed graphic object of the first application, wherein context data comprise: register data of the modules; and fifo data from memory devices between or upstream of the modules, and wherein the register data and the fifo data are alternately arranged in the context data, the assignment of the data to the modules and to the memory devices being fixed by the position of the register data and of the fifo data in the context data.

2. The graphics processing apparatus as claimed in claim 1, wherein the graphics pipeline prescribes a series of successive time slots, the partial processing of one of the first graphic objects and the processing of one of the second graphic objects being performed within a common time slot.

3. The graphics processing apparatus as claimed in claim 2, wherein the successive time slots prescribe a synchronization clock for the processing of the graphic objects.

4. The graphics processing apparatus as claimed in claim 1, further comprising a time planner, the time planner being designed to output a memory signal for interrupting the processing of the first graphic object to the graphics pipeline, and the graphics pipeline being designed to react to the memory signal by outputting the context data of the partially processed graphic object which is buffered and made available for the later serial pass through the graphics pipeline in order to continue the processing of the partially processed graphic object.

5. The graphics processing apparatus as claimed in claim 4, wherein the context data is output to the time planner at the end of the graphics pipeline.

6. The graphics processing apparatus as claimed in claim 5, wherein the time planner is designed to store the context data in a memory.

7. The graphics processing apparatus as claimed in claim 5, wherein the context data is output to the time planner at the end of the graphics pipeline by the raster module.

8. The graphics processing apparatus as claimed in claim 4, wherein the time planner is designed to output a restore signal for passing on the processing of the partially processed graphic object to the graphics pipeline, and the graphics pipeline is designed to react to the restore signal by reading in the context data of the partially processed graphic object in order to continue the processing.

9. The graphics processing apparatus as claimed in claim 4, wherein the time planner forms with the graphics pipeline a ring structure such that upon the occurrence of a memory signal the context data are read out at the end of the graphics pipeline, and such that upon the occurrence of a restore command the context data are loaded into the graphics pipeline.

10. The graphics processing apparatus as claimed in claim 4, further comprising a pixel memory, the time planner being designed to allocate different memory areas to the pixels of the graphic objects of the first and of the second application so that the memory areas of the first and of the second application are separated from one another in the pixel memory.

11. The graphics processing apparatus as claimed in claim 1, wherein the register data has a signal flag which is set to a first value (0) in normal operation and to another value (1) in memory operation.

12. A display apparatus for an aircraft cockpit, having a graphics processing apparatus as claimed in claim 1, having at least a first and a second display area, wherein the display apparatus is configured to display graphic objects of the first application on the first display area, and to display graphic objects of the second application on the second display area.

13. The display apparatus as claimed in claim 12, wherein the first application and the second application have different update rates.

14. A method for displaying graphic objects of at least a first and a second application, in which in the display apparatus as claimed in claim 12, the processing of one of the first graphic objects of the first application is interrupted in a first serial pass through, so that a partially processed graphic object is present, at least one of the second graphic objects of the second application is processed in a second serial pass through, and subsequently the processing of the partially processed graphic object of the first application is continued.

15. A method for displaying graphic objects of at least a first and a second application, in which in the graphics processing apparatus as claimed in claim 1, the processing of one of the first graphic objects of the first application is interrupted in a first serial pass through, so that a partially processed graphic object is present, at least one of the second graphic objects of the second application is processed in a second serial pass through, and subsequently the processing of the partially processed graphic object of the first application is continued.

* * * * *